(12) United States Patent
Li et al.

(10) Patent No.: US 12,231,435 B2
(45) Date of Patent: Feb. 18, 2025

(54) ELECTRONIC DEVICE, METHOD, MEDIUM, AND PROGRAM FOR SWITCHING PARENTAL CONTROL MODES

(71) Applicant: ARRIS Enterprises LLC, Suwanee, GA (US)

(72) Inventors: Jie Li, Shenzhen (CN); Hailiang Zheng, Shenzhen (CN); Na Zhou, Shenzhen (CN); Jun Tao, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 468 days.

(21) Appl. No.: 17/568,887

(22) Filed: Jan. 5, 2022

(65) Prior Publication Data

US 2022/0217151 A1  Jul. 7, 2022

(30) Foreign Application Priority Data

Jan. 5, 2021  (CN) .......................... 202110009652.1

(51) Int. Cl.
*H04L 9/40* (2022.01)
(52) U.S. Cl.
CPC .......... *H04L 63/105* (2013.01); *H04L 63/107* (2013.01)
(58) Field of Classification Search
CPC .............................. H04L 63/105; H04L 63/107
See application file for complete search history.

(56) References Cited

U.S. PATENT DOCUMENTS

| | | | | |
|---|---|---|---|---|
| 6,567,979 B1 * | 5/2003 | deCarmo | ......... | H04N 21/25891 |
| | | | | 725/28 |
| 7,046,139 B2 * | 5/2006 | Kuhn | ................. | H04N 21/4751 |
| | | | | 340/5.74 |
| 8,468,578 B1 * | 6/2013 | Lu | ......................... | H04L 63/101 |
| | | | | 713/168 |

(Continued)

FOREIGN PATENT DOCUMENTS

CA        3 132 996        10/2020

OTHER PUBLICATIONS

International Preliminary Report on Patentability and Written Opinion issued Jul. 20, 2023 in International Application No. PCT/US2022/011231.

(Continued)

*Primary Examiner* — Yonas A Bayou
(74) *Attorney, Agent, or Firm* — Wenderoth, Lind & Ponack, L.L.P.

(57) ABSTRACT

The present disclosure relates to an electronic device, a method, a medium, and a program for switching parental control modes. The electronic device includes: a memory having an instruction stored thereon; and a processor configured to execute the instruction stored on the memory to cause the electronic device to carry out the following operations: determining which control mode of a plurality of control modes a first terminal device connected to the electronic device should be in, the plurality of control modes including a first parental control mode set with a first parental control profile, a second parental control mode set with a second parental control profile, and a common mode set with a common profile; and enabling the determined control mode by applying the profile of the determined control mode to the first terminal device.

20 Claims, 3 Drawing Sheets

(56) References Cited

U.S. PATENT DOCUMENTS

| | | | |
|---|---|---|---|
| 10,078,762 B1* | 9/2018 | Gu | H04N 21/4542 |
| 11,316,902 B2* | 4/2022 | Andrews | H04L 63/20 |
| 2005/0240959 A1* | 10/2005 | Kuhn | H04N 21/4112 |
| | | | 348/E7.061 |
| 2013/0225151 A1* | 8/2013 | King | G06Q 10/10 |
| | | | 455/419 |
| 2014/0181910 A1* | 6/2014 | Fingal | H04L 63/107 |
| | | | 726/4 |
| 2022/0167149 A1* | 5/2022 | Li | G06F 21/35 |

OTHER PUBLICATIONS

International Search Report and the Written Opinion of the International Searching Authority dated Apr. 4, 2022 in International (PCT) Application No. PCT/US2022/011231.

\* cited by examiner

ELECTRONIC DEVICE, METHOD, MEDIUM, AND PROGRAM FOR SWITCHING PARENTAL CONTROL MODES

TECHNICAL FIELD

The present disclosure relates to the field of electronic devices, and in particular to an electronic device, a method, a medium, and a program capable of switching parental control modes.

BACKGROUND ART

With the popularity of the networks and various electronic products, children have more and more opportunities to access networks and various electronic products. In order to protect children's eyesight, it is necessary to control the time that children use electronic products. For the physical and mental health of children, parents need to filter the websites that children may visit and devices that can be connected. As a result, the parental control function is developed.

Generally, the "parental control" function on the home gateway can be set with a graphic user interface (GUI) page. Parents can insert certain websites in an allow list and other websites in a deny list, and can set certain time slots to allow network access and certain time slots to prohibit network access. From the perspective of actual needs, for some parents, the "rules" of how their children use the Internet are different when the parents are at home and when the parents are not at home. For example, if parents are home, their children may be allowed to visit most websites (although there are still some restrictions), which gives them more freedom, because parents can always see the screens of electronic products in children's hands any way. However, if parents are not home, it is desired to restrict the children's electronic products (such as personal computers, PCs) to access limited websites only.

Therefore, it is desirable to be able to set different profiles for different parental control modes, and be able to freely switch between different profiles so as to apply different parental control modes to different scenarios.

SUMMARY OF THE INVENTION

The present disclosure provides an electronic device, a method, a medium, and a program capable of switching parental control modes, which can apply different parental control modes to different scenarios, thereby improving user experience.

Some aspects of the present disclosure relate to an electronic device, which includes: a memory having an instruction stored thereon; and a processor configured to execute the instruction stored on the memory to cause the electronic device to carry out the following operations: determining which control mode of a plurality of control modes a first terminal device connected to the electronic device should be in, the plurality of control modes including a first parental control mode set with a first parental control profile, a second parental control mode set with a second parental control profile, and a common mode set with a common profile; and enabling the determined control mode by applying the profile of the determined control mode to the first terminal device.

In some embodiments, the processor is further configured to execute an instruction stored on the memory to cause the electronic device to carry out the following operation: setting a second terminal device as a parental control device, the parental control device having an authority to configure the electronic device.

In some embodiments, the processor is further configured to execute an instruction stored on the memory to cause the electronic device to carry out the following operations: receiving a user input on a configuration interface of the electronic device through the parental control device; and activating the corresponding profile in response to the user input.

In some embodiments, the configuration interface of the electronic device is a page accessed through a browser.

In some embodiments, the configuration interface of the electronic device is an interface of an application program installed on the parental control device for configuring the electronic device.

In some embodiments, the processor is further configured to execute an instruction stored on the memory to cause the electronic device to carry out the following operations: recording the location of the electronic device when initially configuring the electronic device through the application program; positioning the parental control device; and applying the first parental control profile to the first terminal device when the distance between the position of the parental control device and the recorded position of the electronic device is equal to or less than a predetermined threshold, otherwise applying the second parental control profile to the first terminal device.

In some embodiments, the processor is further configured to execute an instruction stored on the memory to cause the electronic device to carry out the following operations: applying the first parental control profile to the first terminal device when it is detected that the parental control device is connected to the electronic device, otherwise applying the second parental control profile to the first terminal device.

In some embodiments, the first terminal device and the second terminal device are each identified by a MAC address.

In some embodiments, the electronic device is a router.

Other aspects of the present disclosure relate to a method for switching parental control modes, including: determining which control mode of a plurality of control modes a first terminal device connected to the electronic device should be in, the plurality of control modes including a first parental control mode set with a first parental control profile, a second parental control mode set with a second parental control profile, and a common mode set with a common profile; and applying the profile of the determined control mode to the first terminal device to enable the determined control mode.

In some embodiments, the method further includes: setting a second terminal device as a parental control device, the parental control device having an authority to configure the electronic device.

In some embodiments, determining which control mode of a plurality of control modes the first terminal device of the electronic device should be in include: receiving a user input on a configuration interface of the electronic device through the parental control device; and activating the corresponding profile in response to the user input.

In some embodiments, the configuration interface of the electronic device is a page accessed through a browser.

In some embodiments, the configuration interface of the electronic device is an interface of an application program installed on the parental control device for configuring the electronic device.

In some embodiments, the method further include: recording the location of the electronic device when initially configuring the electronic device through the application program; positioning the parental control device; and applying the first parental control profile to the first terminal device when the distance between the position of the parental control device and the recorded position of the electronic device is equal to or less than a predetermined threshold, otherwise applying the second parental control profile to the first terminal device.

In some embodiments, the method further includes: applying the first parental control profile to the first terminal device when it is detected that the parental control device is connected to the electronic device, otherwise applying the second parental control profile to the first terminal device.

In some embodiments, the first terminal device and the second terminal device are each identified by a MAC address.

In some embodiments, the electronic device is a router.

Other aspects of the present disclosure relate to a non-transitory computer-readable medium which has an instruction stored thereon to be executed by a processor so as to execute a step of the method described above.

Other aspects of the present disclosure relate to a computer program product including a computer program, when executed by a processor, the computer program executing a step of the method described above.

BRIEF DESCRIPTION OF THE ATTACHED DRAWINGS

For a better understanding of the present disclosure and to show how to implement the present disclosure, examples are herein described with reference to the attached drawings, wherein.

It should be noted that throughout the attached drawings, similar reference numerals and signs refer to corresponding parts.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is limited by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
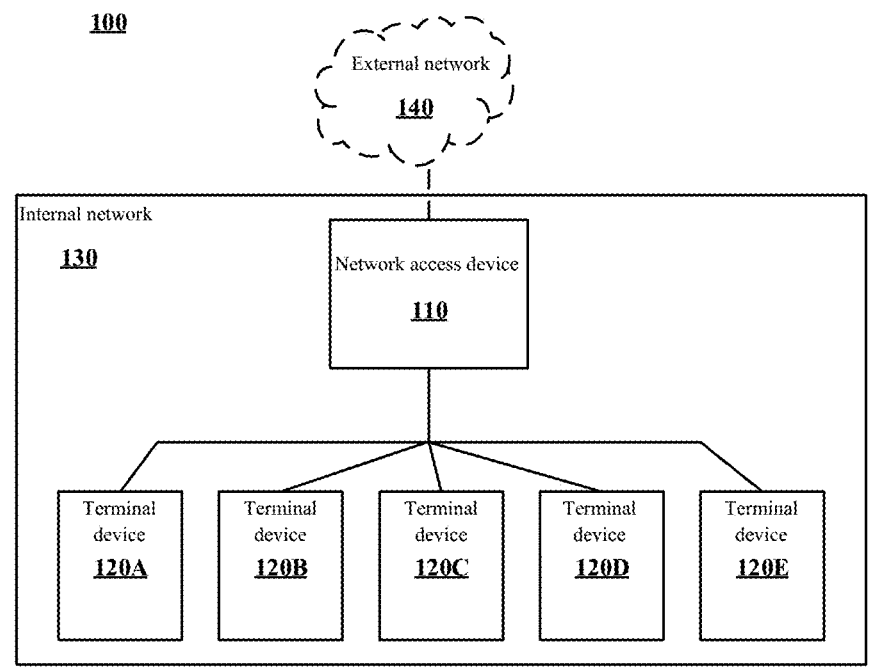
FIG. 1 is a schematic diagram showing an example network environment including a network access device according to an embodiment of the present disclosure.

FIG. 1 is a schematic diagram showing an example network environment 100 including a network access device according to an embodiment of the present disclosure.

The example network environment 100 may include a network access device 110 and one or more terminal devices 120A, 120B, 120C, 120D, and 120E (hereinafter collectively referred to as terminal device 120 for convenience). The network access device 110 is used to provide a network connection for the terminal device 120. Specifically, the network access device 110 may receive/route various types of communications from the terminal device 120 and/or transmit/route various types of communications to the terminal device 120. In some embodiments, the network access device 110 only provides an internal network 130 (for example, wired or wireless local area network (LAN)) connection for the terminal device 120, and all terminal devices 120 connected to the network access device 110 are in the same internal network and can directly communicate with each other. In a further embodiment, the network access device 110 is further connected to an external network 140, so that the terminal device 120 can access the external network 140 via the network access device 110. The network access device 110 may be, for example, a hardware electronic device which combines the functions of a network access server (NAS), a modem, a router, a layer 2/layer 3 switch, an access point, etc. The network access device 110 may further include, but is not limited to, a function of an IP/QAM set top box (STB) or a smart media device (SMD), and the IP/QAM set top box (STB) or the smart media device (SMD) can decode audio/video content and play content provided by OTT or MSO.

In some embodiments, the terminal device 120 may be any electronic device having at least one network interface. For example, the terminal device 120 may be: a desktop computer, a laptop computer, a server, a mainframe computer, a cloud-based computer, a tablet computer, a smart phone, a smart watch, a wearable device, a consumer electronic device, a portable computing device, a radio node, a router, a switch, a repeater, an access point and/or other electronic devices. As described in detail below with reference to FIG. 2, the terminal device 120 communicates with a physical or virtual network interface of the network access device 110 using its network interface, thereby accessing the internal network 130 via the network access device 110. A plurality of terminal devices 120A, 120B, 120C, 120D, and 120E may be connected to the same or different network interfaces of the network access device 110. Although five terminal devices are shown in FIG. 1, it should be understood that the number of terminal devices that can be connected to the network access device may be less than or more than five, depending on the number of specific physical interfaces and/or network capacity supported by the network access device.

The external network 140 may include various types of wired or wireless networks, internal networks or public networks, for example, other local area networks or wide area networks (WAN) (such as the Internet). It should be noted that the present disclosure does not specifically define the type of the external network 140.

Figure 2:
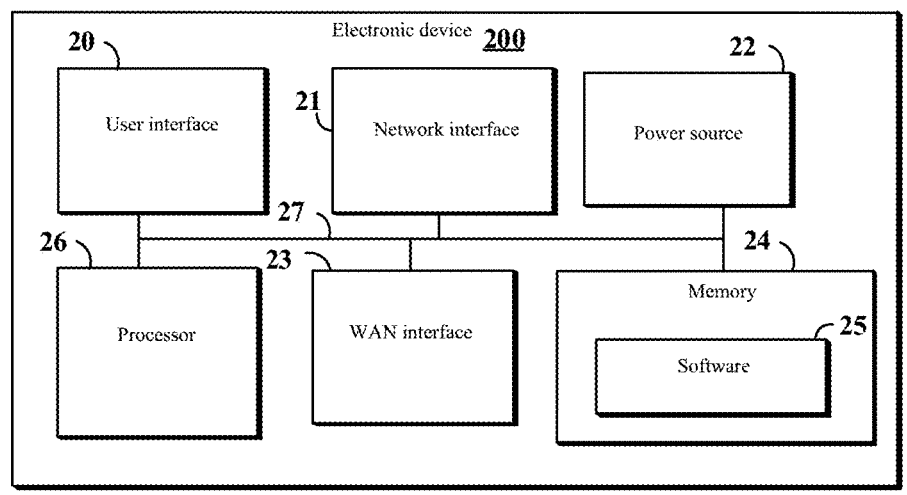
FIG. 2 is a block diagram showing an electronic device for implementing the network access device according to an embodiment of the present disclosure.

FIG. 2 is a block diagram showing an example configuration of an electronic device 200 according to an embodiment of the present disclosure. The electronic device 200 may be used to enable the network access device 110 in FIG. 1.

As shown in FIG. 2, the electronic device 200 includes a user interface 20, a network interface 21, a power source 22, an external network interface 23, a memory 24, and a processor 26. The user interface 20 may include, but is not limited to, a button, a keyboard, a keypad, LCD, CRT, TFT, LED, HD or other similar display devices, including a display device with a touch screen capability that enables interaction between a user and a gateway device. In some embodiments, the user interface 20 may be used to present a graphical user interface (GUI) to receive user input.

The network interface 21 may include various network cards and a circuit system enabled by software and/or hardware so as to be able to communicate with a user device using wired or wireless protocols. The wired communication protocol is, for example, any one or more of the Ethernet protocol, the MoCA specification protocol, the USB protocol, or other wired communication protocols. The wireless protocol is, for example, any IEEE 802.11 Wi-Fi protocol, Bluetooth protocol, Bluetooth Low Energy (BLE) or other short-distance protocols operated in accordance with wireless technology standards, and is used for utilization of any licensed or unlicensed frequency band (for example, the Citizen Broadband Radio Service (CBRS) band, 2.4 GHz band, 5 GHz band, 6 GHz band, or 60 GHz band), RF4CE protocol, ZigBee protocol, Z-Wave protocol, or IEEE 802.15.4 protocol to exchange data over a short distance. When the network interface 21 uses a wireless protocol, in some embodiments, the network interface 21 may further include one or more antennas (not shown) or a circuit node to be coupled to one or more antennas. The electronic device 200 may provide an internal network (for example, the internal network 130 in FIG. 1) to the user device through the network interface 21.

The power source 22 provides power to internal components of the electronic device 200 through an internal bus 27. The power source 22 may be a self-contained power source such as a battery pack, the interface of which is powered by (for example, directly or through other devices) a charger connected to a socket. The power source 22 may further include a rechargeable battery that is detachable for replacement, for example, NiCd, NiMH, Li-ion, or Li-pol battery. The external network interface 23 may include various network cards and a circuit system enabled by software and/or hardware so as to achieve communication between the electronic device 200 and a provider (for example, an Internet service provider or a multi-system operator (MSO)) of an external network (for example, the external network 140 in FIG. 1).

The memory 24 includes a single memory or one or more memories or storage locations, including but not limited to a random access memory (RAM), a dynamic random access memory (DRAM), a static random access memory (SRAM), a read-only memory (ROM), EPROM, EEPROM, a flash memory, FPGA logic block, a hard disk, or any other layers of a memory hierarchy. The memory 24 may be used to store any type of instructions, software or algorithms, including software 25 for controlling general functions and operations of the electronic device 200.

The processor 26 controls general operations of the electronic device 200 and executes management functions related to other devices (such as a user device) in the network. The processor 26 may include, but is not limited to, a CPU, a hardware microprocessor, a hardware processor, a multi-core processor, a single-core processor, a microcontroller, an application-specific integrated circuit (ASIC), a DSP, or other similar processing devices, which can execute any type of instructions, algorithms, or software for controlling the operations and functions of the electronic device 200 according to the embodiments described in the present disclosure. The processor 26 may be various implementations of a digital circuit system, an analog circuit system, or a mixed signal (combination of analog and digital) circuit system that executes functions in a computing system. The processor 26 may include, for example, an integrated circuit (IC), a part or circuit of a separate processor core, an entire processor core, a separate processor, a programmable hardware device such as a field programmable gate array (FPGA), and/or a system including a plurality of processors.

The internal bus 27 may be used to establish communication between the components of the electronic device 200 (for example, 20 to 22, 24 and 26).

Although specific components are used to describe the electronic device 200, in an alternative embodiment, there may be different components in the electronic device 200. For example, the electronic device 200 may include one or more additional controllers, memories, network interfaces, external network interfaces and/or user interfaces. In addition, one or more of the components may not exist in the electronic device 200. Moreover, in some embodiments, the electronic device 200 may include one or more components not shown in FIG. 2. In addition, although separate components are shown in FIG. 2, in some embodiments, some or all of the given components may be integrated into one or more of the other components in the electronic device 200. Moreover, any combination of analog and/or digital circuits may be used to enable the circuit and components in the electronic device 200.

Figure 3:
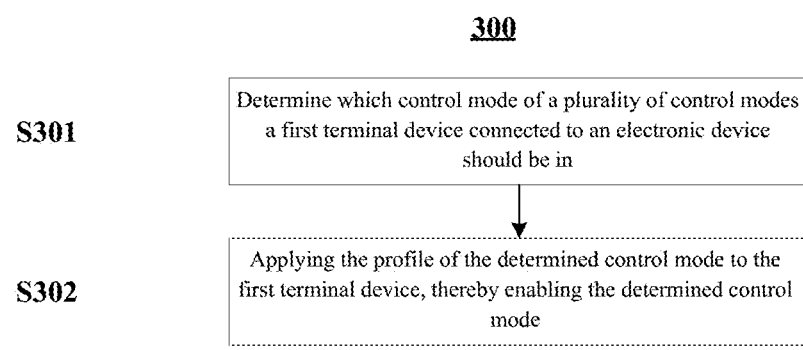
FIG. 3 is a flowchart showing an exemplary method for switching parental control modes according to an embodiment of the present disclosure.
Figure 4:
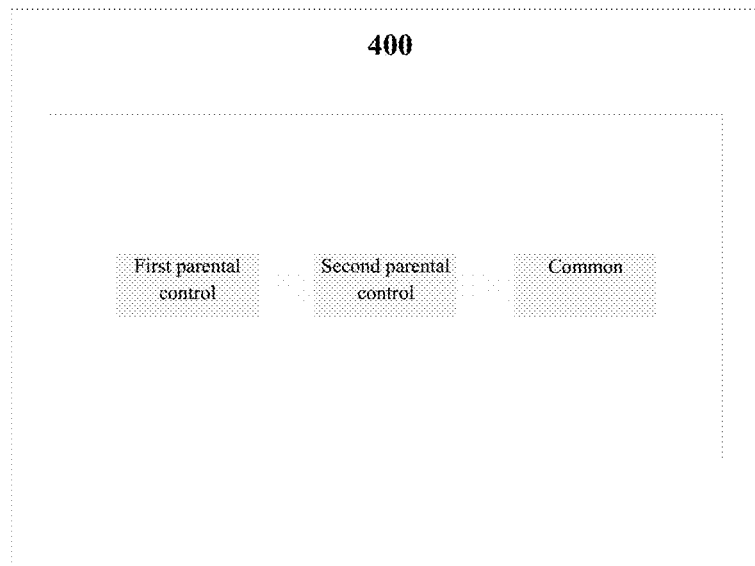
FIG. 4 and FIG. 5 show exemplary user interfaces for switching profiles according to an embodiment of the present disclosure.
Figure 5:
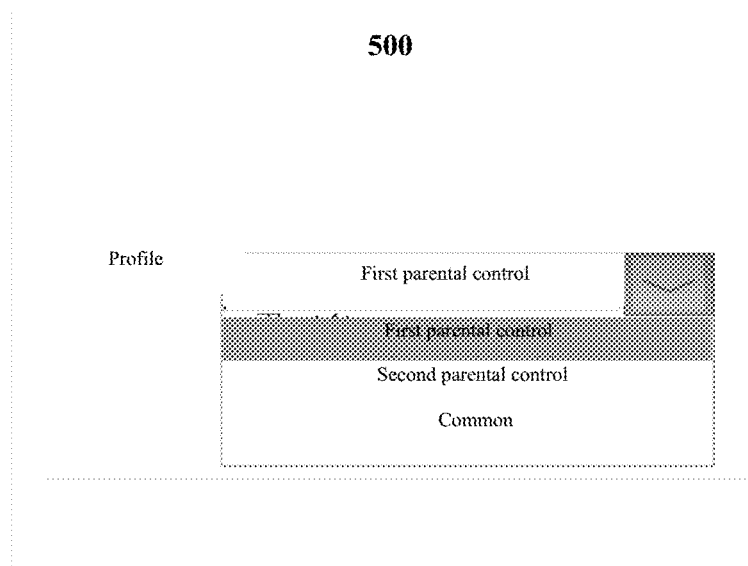

FIG. 3 is a flowchart showing an exemplary method 300 for switching parental control modes according to an embodiment of the present disclosure. The method 300 may be executed, for example, by the network access device 110 shown in FIG. 1 or the electronic device 200 shown in FIG. 2. FIGS. 4 and 5 show exemplary user interfaces 400 and 500 for switching profiles according to an embodiment of the present disclosure. The electronic device and the method used for the electronic device according to embodiments of the present disclosure will be described in detail below with reference to FIG. 1 to FIG. 3 and FIGS. 4 and 5.

As shown in FIG. 3, in step S301, it is determined which control mode of a plurality of control modes a first terminal device connected to the electronic device should be in. In some embodiments, the plurality of control modes include (but are not limited to) a first parental control mode set with a first parental control profile, a second parental control mode set with a second parental control profile, and a common mode set with a common profile. Here, "first" and/or "second" are only for ease of description and differentiation, and are not intended to emphasize sequence. For example, the first parental control mode may be a control mode where a parent is at home, the second parental control mode may be a control mode where the parent is not at home, and the common mode may be a control mode without restrictions on access to the network and various electronic devices. According to an embodiment of the present disclosure, the first terminal device may be identified by a MAC address.

According to an embodiment of the present disclosure, in order to set parental control on the first terminal device, one or more terminal devices need to be set as a parental control device that has an authority to configure the electronic device. For example, 120A and/or 120B in FIG. 1 may be set as parental control devices. According to an embodiment of the present disclosure, the parental control device may be identified by a MAC address.

According to an embodiment of the present disclosure, determining which control mode of a plurality of control modes a first terminal device connected to the electronic device should be in may include receiving a user input on a configuration interface of the electronic device through the parental control device, and activating the corresponding profile in response to the user input. In this way, it is possible to receive a user input on a web-based interface (for example, a router configuration webpage accessed through a browser) through a computer which is set as a parental control device (such as 120A in FIG. 1) to select the corresponding parental control profile for a child's computer (such as 120C in FIG. 1) and/or a child's mobile phone (such as 120E in FIG. 1), and it is also possible to receive a user input through an interface of an application program (for example, an app developed by a router developer to configure a router) installed on a mobile device which is set as a parental control device (such as 120B in FIG. 1) to select the corresponding parental control profile for a child's computer and/or a child's mobile phone.

In step S302, the profile of the determined control mode is applied to the first terminal device, thereby enabling the determined control mode.

In the case of receiving a user input through an interface of an application program (for example, an app developed by a router developer to configure a router) installed on a mobile device (such as 120B in FIG. 1) to select the corresponding parental control profile for a child's computer and/or a child's mobile phone, it is possible to automatically switch between different parental control modes. The method of automatic switching will be described in detail below.

In some embodiments, method 300 may further include an optional step S303 of recording the location of the electronic device when initially configuring the electronic device through the application program, positioning the parental control device, and applying the first parental control profile to the first terminal device when the distance between the position of the parental control device and the recorded position of the electronic device is equal to or less than a predetermined threshold, otherwise applying the second parental control profile to the first terminal device. As a result, automatic switching between different parental control modes is achieved through comparison with the threshold. The predetermined threshold here may be set by the parents as needed.

In some embodiments, the method 300 may further include a step S304 of applying the first parental control profile to the first terminal device when it is detected that the parental control device is connected to the electronic device, otherwise applying the second parental control profile to the first terminal device. As a result, automatic switching between different parental control modes is achieved through the detection of connection information.

In a preferable embodiment of the present disclosure, the electronic device is a router.

FIGS. 4 and 5 show exemplary user interfaces 400 and 500 for switching profiles according to an embodiment of the present disclosure.

In an embodiment, as shown in FIG. 4, the first parental control profile, the second parental control profile, and the common profile are presented to the user on the configuration interface of the electronic device (for example, the router configuration webpage accessed through a browser on the parental control device, or the interface of an app installed on the parental control device developed by a router developer to configure a router). FIG. 4 is only an example. The profiles of the control modes are not limited to these three, and there can be more than three (for example, five, ten, etc.) or less than three (for example, only the first parental control mode and the second parental control mode, etc.). The user may select a profile on the configuration interface, and activate the selected profile by clicking the mouse or pressing the enter key.

In an embodiment, as shown in FIG. 5, a pull-down menu control of the profile is presented to the user on the configuration interface of the electronic device (for example, the router configuration webpage accessed through a browser on the parental control device, or the interface of an app installed on the parental control device developed by a router developer to configure a router). In the example shown in FIG. 5, the first parental control profile, the second parental control profile, and the common profile are shown in the pull-down menu. As described above, FIG. 5 is only an example. The profiles of the control modes are not limited to these three, and there can be more than three (for example, five, ten, etc.) or less than three (for example, only the first parental control mode and the second parental control mode, etc.). The user can select and activate a certain profile (for example, the first parental control profile) in the pull-down menu.

Through the above method of switching parental control profiles, it is possible to manually or automatically apply different parental control modes to different scenarios, thereby improving user experience.

The present disclosure may be implemented as any combination of devices, systems, integrated circuits, and computer programs on non-transitory computer-readable media. One or more processors may be enabled as an integrated circuit (IC), an application specific integrated circuit (ASIC) or a large-scale integrated circuit (LSI), a system LSI, a super LSI, or an ultra LSI component that performs part or all of the functions described in the present disclosure.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or more memories store software or algorithm with executable instructions, and one or more processors can associate with a set of instructions for executing the software or algorithm so as to provide network configuration information management functions of network access devices according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

The invention claimed is:

1. An electronic device, including:
   a memory having an instruction stored thereon; and
   a processor configured to execute the instruction stored on the memory to cause the electronic device to carry out the following operations:
      determining which control mode of a plurality of control modes a first terminal device connected to the electronic device should be in, the plurality of control modes including a first parental control mode set with a first parental control profile, a second parental control mode set with a second parental control profile, and a common mode set with a common profile; and
      enabling the determined control mode by applying the profile of the determined control mode to the first terminal device.

2. The electronic device according to claim 1, wherein the processor is further configured to execute an instruction stored on the memory to cause the electronic device to carry out the following operation:
   setting a second terminal device as a parental control device, the parental control device having an authority to configure the electronic device.

3. The electronic device according to claim 2, wherein the processor is further configured to execute an instruction stored on the memory to cause the electronic device to carry out the following operations:
   receiving a user input on a configuration interface of the electronic device through the parental control device; and
   activating the corresponding profile in response to the user input.

4. The electronic device according to claim 3, wherein the configuration interface of the electronic device is a page accessed through a browser.

5. The electronic device according to claim 3, wherein the configuration interface of the electronic device is an interface of an application program installed on the parental control device for configuring the electronic device.

6. The electronic device according to claim 5, wherein the processor is further configured to execute an instruction stored on the memory to cause the electronic device to carry out the following operations:
   recording the location of the electronic device when initially configuring the electronic device through the application program;
   positioning the parental control device; and
   applying the first parental control profile to the first terminal device when the distance between the position of the parental control device and the recorded position of the electronic device is equal to or less than a predetermined threshold, otherwise applying the second parental control profile to the first terminal device.

7. The electronic device according to claim 2, wherein the processor is further configured to execute an instruction stored on the memory to cause the electronic device to carry out the following operations:
   applying the first parental control profile to the first terminal device when it is detected that the parental control device is connected to the electronic device, otherwise applying the second parental control profile to the first terminal device.

8. The electronic device according to claim 2, wherein the first terminal device and the second terminal device are each identified by a MAC address.

9. The electronic device according to claim 1, wherein the electronic device is a router.

10. A method for switching parental control modes, including:
    determining which control mode of a plurality of control modes a first terminal device connected to the electronic device should be in, the plurality of control modes including a first parental control mode set with a first parental control profile, a second parental control mode set with a second parental control profile, and a common mode set with a common profile; and
    applying the profile of the determined control mode to the first terminal device to enable the determined control mode.

11. The method according to claim 10, further including:
    setting a second terminal device as a parental control device, the parental control device having an authority to configure the electronic device.

12. The method according to claim 11, wherein determining which control mode of a plurality of control modes the first terminal device of the electronic device should be in includes:
    receiving a user input on a configuration interface of the electronic device through the parental control device; and
    activating the corresponding profile in response to the user input.

13. The method according to claim 12, wherein the configuration interface of the electronic device is a page accessed through a browser.

14. The method according to claim 12, wherein the configuration interface of the electronic device is an interface of an application program installed on the parental control device for configuring the electronic device.

15. The method according to claim 14, further including:
    recording the location of the electronic device when initially configuring the electronic device through the application program;
    positioning the parental control device; and
    applying the first parental control profile to the first terminal device when the distance between the position of the parental control device and the recorded position of the electronic device is equal to or less than a predetermined threshold, otherwise applying the second parental control profile to the first terminal device.

16. The method according to claim 11, further including:
applying the first parental control profile to the first terminal device when it is detected that the parental control device is connected to the electronic device, otherwise applying the second parental control profile to the first terminal device.

17. The method according to claim 11, wherein the first terminal device and the second terminal device are each identified by a MAC address.

18. The method according to claim 10, wherein the electronic device is a router.

19. A non-transitory computer-readable medium, the non-transitory computer-readable medium having an instruction stored thereon to be executed by a processor so as to execute a step of the method according to claim 10.

20. A computer program product including a computer program, when executed by a processor, the computer program executing a step of the method according to claim 10.

* * * * *